United States Patent [19]
Yang et al.

[11] Patent Number: 5,911,079
[45] Date of Patent: Jun. 8, 1999

[54] COMPUTER SYSTEM HAVING A PARALLEL PORT FOR ITS PERIPHERAL DEVICE AND AN EXPANSION DEVICE THEREOF

[75] Inventors: Sung-Dong Yang; Kwan-Ho Lee, both of Suwon, Rep. of Korea

[73] Assignee: SamSung Electronics Co., Ltd., Kyungki-do, Rep. of Korea

[21] Appl. No.: 08/840,631

[22] Filed: Apr. 25, 1997

[30] Foreign Application Priority Data

Apr. 26, 1996 [KR] Rep. of Korea .................. 96-13117
Jan. 8, 1997 [KR] Rep. of Korea .................. 97-147 U

[51] Int. Cl.$^6$ .................................................. G06F 1/32
[52] U.S. Cl. ........................ 395/750.01; 395/750.03; 395/750.02; 395/750.06; 395/750.08
[58] Field of Search ................ 395/750.01, 750.03, 395/750.07, 750.08, 750.06, 750.02, 281; 364/492; 365/226, 227

[56] References Cited

U.S. PATENT DOCUMENTS

| | | |
|---|---|---|
| 5,359,540 | 10/1994 | Ortiz .................................. 364/492 |
| 5,408,669 | 4/1995 | Stewart et al. .................. 395/750.01 |
| 5,423,004 | 6/1995 | Porter . | |
| 5,438,678 | 8/1995 | Smith . | |
| 5,457,785 | 10/1995 | Kikinis et al. ........................ 395/308 |
| 5,594,672 | 1/1997 | Hicks . | |
| 5,603,040 | 2/1997 | Frager et al. . | |

*Primary Examiner*—Ayaz R. Sheikh
*Assistant Examiner*—Ario Etienne
*Attorney, Agent, or Firm*—Robert E. Bushnell, Esq.

[57] ABSTRACT

A peripheral device in need of power supply connected to a parallel port of an expansion device linking the portable computer system, and to a parallel port of the portable computer system, which will be supplied power through the parallel port. In this computer system, the first parallel port must be installed and the second parallel port must be extended from the portable computer to the expansion device. And between the first and second parallel port, the first and the second peripheral device interconnection recognizing mechanism must be equipped to recognize the type of peripheral device. Also the first and the second power supply must be equipped to cut off or on the power to the peripheral device through the parallel port when the first and the second peripheral device interconnection recognizing mechanism give the recognizing signal. Furthermore the first power supply and the second power supply mechanism doesn't supply power when it recognizes that no peripheral device is connected to the first and second parallel port, or a peripheral device with no need of the power supply is connected. The first and the second power supply mechanism supplies power to a peripheral device through the first and second parallel port when it recognizes that a peripheral device in need of power supply is connected to the first parallel port and the second parallel port.

12 Claims, 11 Drawing Sheets

COMPUTER SYSTEM HAVING A PARALLEL PORT FOR ITS PERIPHERAL DEVICE AND AN EXPANSION DEVICE THEREOF

CROSS REFERENCE TO RELATED APPLICATION

This application makes reference to, incorporates the same herein, and claims all benefits accruing under 35 U.S.C. §119 from applications for A COMPUTER SYSTEM A PARALLEL PORT AS A POWER SUPPLY FOR ITS PERIPHERAL DEVICE AND AN EXTENSION DEVICE THEREOF earlier filed in the Korean Industrial Property Office on Apr. 26, 1996, and there duly assigned Ser. No. 96-13117, and A COMPUTER SYSTEM A PARALLEL PORT AS A POWER SUPPLY FOR ITS PERIPHERAL DEVICE AND AN EXTENSION DEVICE THEREOF earlier filed in the Korean Industrial Property Office on Jan. 8, 1997, and there duly assigned Utility Model Ser. No. 97-147.

BACKGROUND OF THE INVENTION

1. Field of the Invention

The invention relates to a computer system having a parallel port installed in a portable compute such as a notebook or a laptop computer. It is mainly focused on an expansion device like a port replicator and a docking station to expand the utility of the above-mentioned portable computer. If connected to the peripheral device which needs power supply, this expansion device enables the power supply to give power to the peripheral device.

2. Description of the Prior Art

The use of a power pin in a parallel port connector may not be new in the prior art. U.S. Pat. No. 5,408,669 for a *Computer System For Sensing A Cable-Connected Peripheral For Supplying Power Thereto* to Stewart et al. discloses a computer system including an input/output connector for connecting to an external data peripheral, where the computer includes circuitry for detecting the presence or absence of a load on a first pin and for providing power to the external data peripheral through a second pin of the I/O connector. In this manner, the external data peripheral need not include a separate power supply, but instead is sensed and powered by the computer itself through the I/O connector.

U.S. Pat. No. 5,594,672 for a *Peripheral Power Saver* to Hicks discloses a device that saves energy by turning on power to a peripheral device such as a printer only when a host computer sends data to its I/O port. This invention does not have the host computer power the printer. Instead, a power saver back is used power a printer or a peripheral device. This power saver back is connected to the computer, and receives information from the computer on whether or not the peripheral should be energized.

U.S. Pat. No. 5,603,040 for a *Power Management Control Unit for a Computer Peripheral* to Frager et al. discloses a power management control unit and system is provided for selectively controlling ac power to one or more computer peripheral devices. The power management control unit includes a power cord connected to an ac supply and an outlet pin capable of electrically receiving the peripheral device. The management control unit also includes an ac switch electrically coupled between the power cord and the outlet pin, such that the switch can modulate conduction between the power cord and outlet pin during use.

U.S. Pat. No. 5,423,004 for a *Computer With Electrically Isolated Printer Port Using Shunt Transistors Controlled by a Common Charge-Robbing Node* to Porter discloses a parallel port adapter which provides a special buffering circuit on the four control lines from the system to the printer. This circuit provides a low-impedance bidirectional path for communication between the CPU and the printer whenever any of the control lines are active. The circuit uses blocking diodes on all four lines, and uses pass transistors in parallel with the blocking diodes, and uses power-robbing to turn on the pass transistors whenever the port is in use.

What is needed is a simplified circuit that provides power to a peripheral device through a parallel port cable if the peripheral needs power.

SUMMARY OF THE INVENTION

The aim of the invention is to supply the computer which on one hand supplies power through the parallel port of the portable computer system to the peripheral device in case it needs power supply, and on the other hand cuts off the power through the parallel port in case the peripheral device doesn't need power.

Another aim of this invention is to recognize whether or not the peripheral device needs any power when the portable computer system is connected to the expansion device and the peripheral device is connected to the parallel port of the expansion device. If the peripheral device does need any power, it will be supplied through the parallel port of the expansion device. If the peripheral device does not need power, it will be cut off through the parallel port. In order to achieve this, the first parallel port must be installed in the portable computer system, and the second parallel port must be installed in the expansion device. In addition to these two, the first and the second peripheral device interconnection recognizing mechanism(PDIRM) are needed to recognize whether the peripheral device needs any power or not. Also the first and the second power supply mechanism(PSM) are needed to supply or cut off power according to the recognizing signal of the peripheral device interconnection recognizing mechanism. If the first and the second peripheral device interconnection recognizing mechanism recognize that the peripheral device is not connected to the first and the second parallel port or the peripheral device like a printer which doesn't need power supply is connected, first and the second power supply doesn't supply power according to the signal of first and the second peripheral device.

If the first and the second peripheral device interconnection recognizing mechanism recognize that the first and the second parallel port are connected to the peripheral device which needs the power supply, the first and the second power supply supplies power through the first and the second parallel port according to the signal of the first and the second parallel port.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 3a and 3b is a view showing the portable computer system connected with the compact disk read only memory drive and the floppy disk drive;

FIGS. 7a and 7b is the back side of the portable computer system according to this invention;

DETAILED DESCRIPTION OF THE INVENTION

Figure 1:
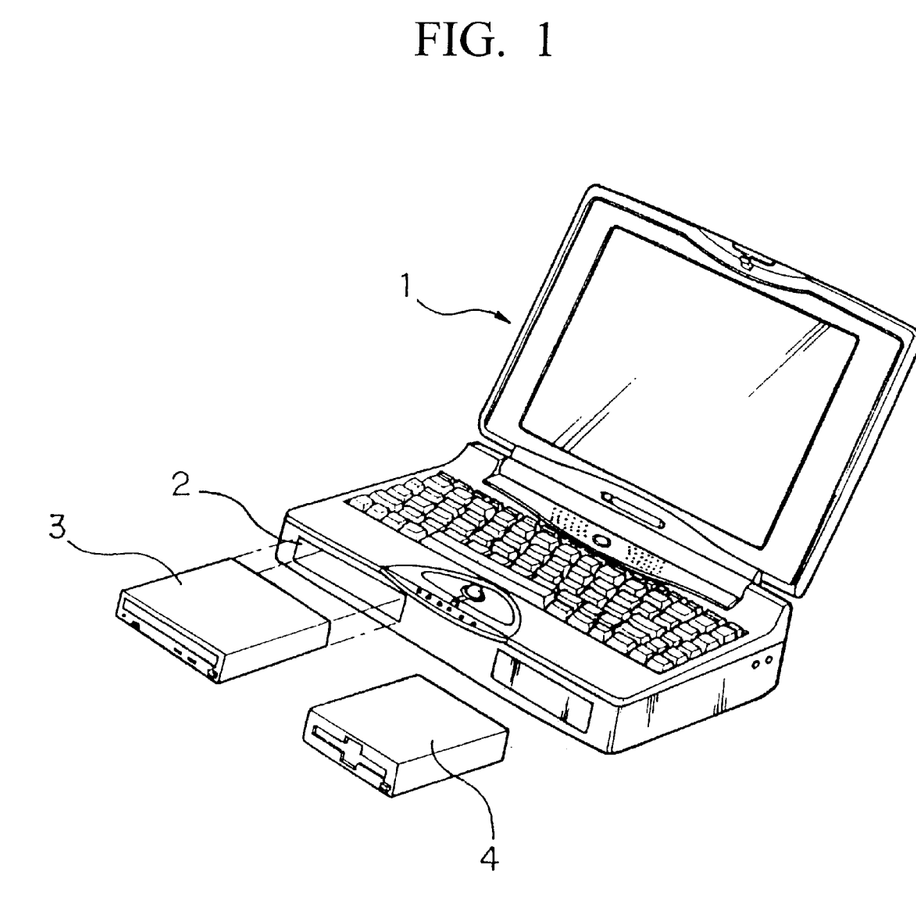
FIG. 1 is a view showing the compact disk read only memory drive and the floppy disk drive connected to the of the portable computer system.

Nowadays a portable computer system like a notebook or a laptop computer are trying to lighten the weight of the main body in order to make it as portable as possible. Therefore the minimum amount of peripheral devices are built inside the computer. As a result, computer users connect peripheral devices not installed in the computer optionally in case of need. These peripheral devices can include a compact disk read only memory drive, a floppy disk drive, an external hard disk drive and a printer which will be connected to the above mentioned computers. FIG. 1 shows an example of a notebook computer connecting an interface connector at the left front to use a compact disk read only memory drive and a floppy disk drive as external devices. The user can optionally connect the compact disk read only memory drive 3 or the floppy disk drive 4 to the interface connector 2.

Figure 2:
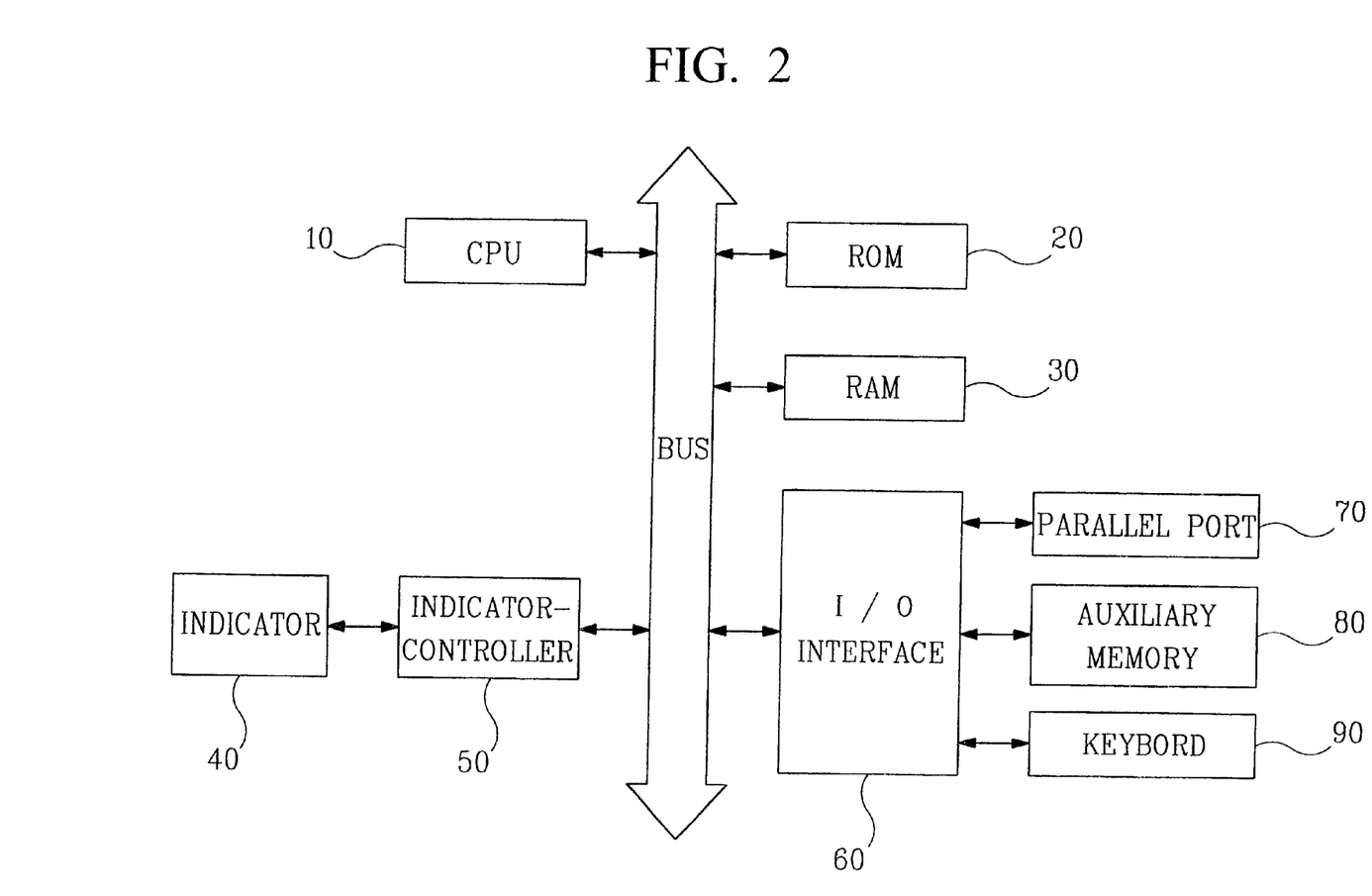
FIG. 2 is a block diagram showing the structure of a normal portable computer system.

FIG. 2 is a block diagram showing the structure of the portable computer system like a notebook computer etc. As shown in here, a central processor unit (CPU) 10 controlling the movement of a portable computer system, a read only memory 20, a random access memory 30, an indicator-controller 50 controlling images in an indicator 40 and an I/O interface 60 are mutually interconnected through a bus. To the I/O interface 60 the parallel port 70, the auxilary memory 80, and the keyboard 90 will be connected. Since the portable computer system 1 of FIG. 1 has only one interface connector 2, it has to choose one of the compact disk read only memory 3 and the floppy disk drive 4.

Figure 3A:
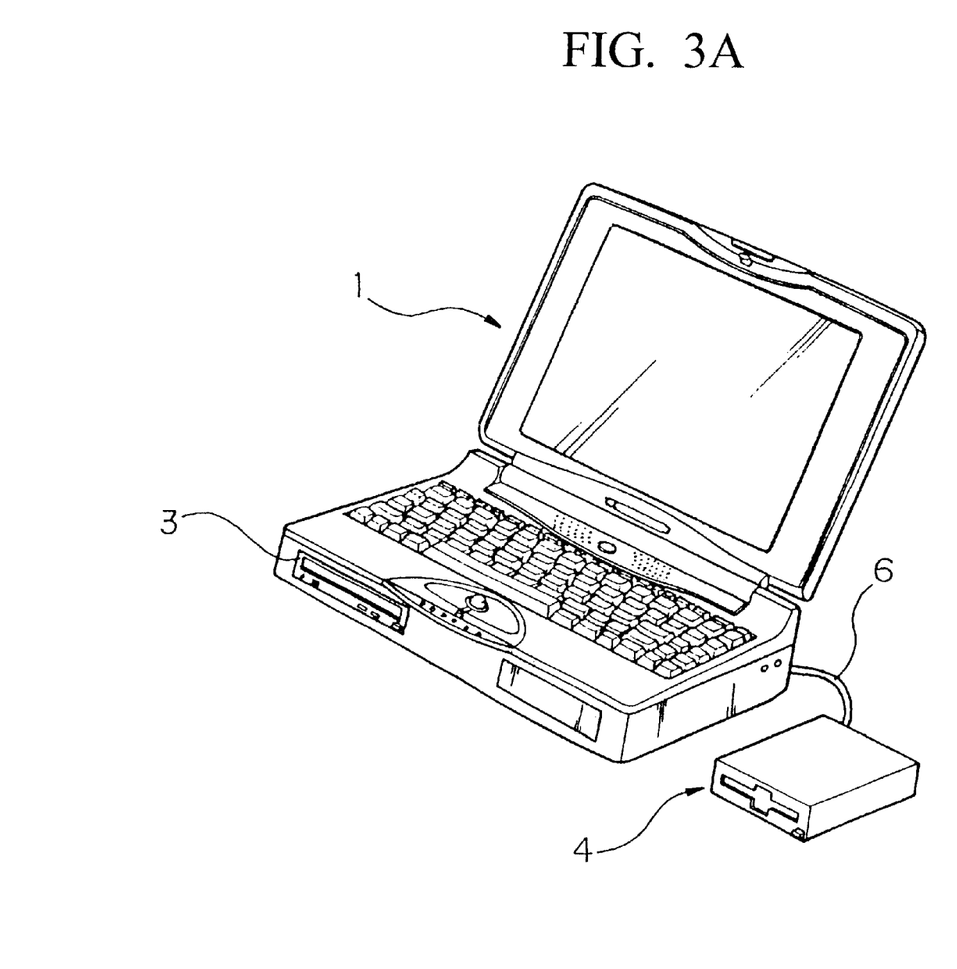
FIG. 3a is a drawing showing that the compact disk read only memory drive is connected to the interface connector of the portable computer system and the floppy disk drive to the parallel port.
Figure 3B:
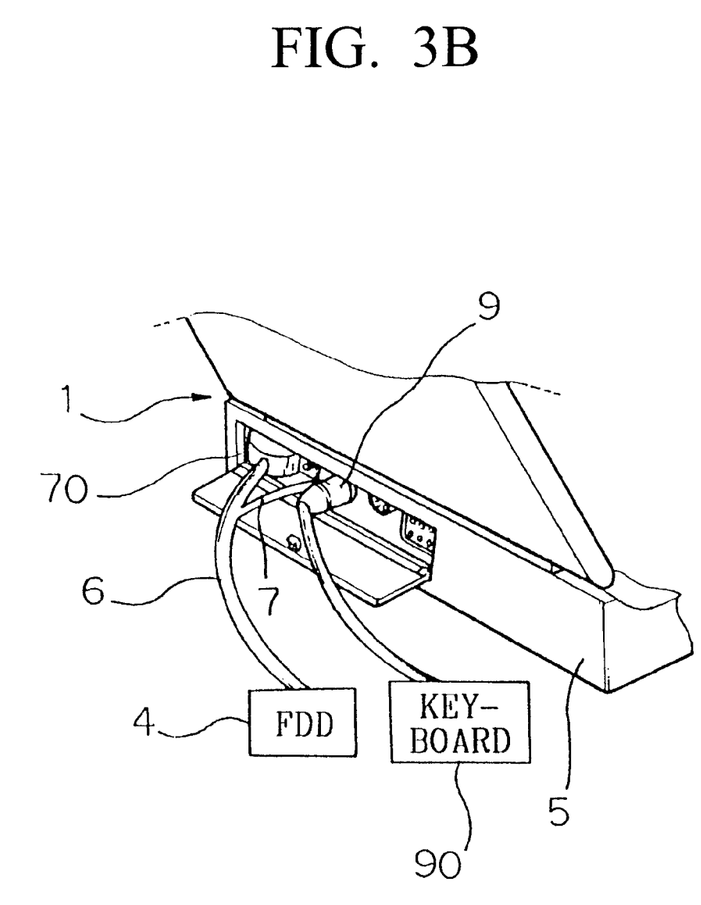
FIG. 3b is a drawing showing that the floppy disk drive is connected to the parallel port at the back of the portable computer system.

If the user wants to use both, the compact disk read only memory 3 and the floppy disk drive 4 simultaneously, he has to connect one to the interface connector 2, and the other to the parallel port 70 through the cable. As an example, FIG. 3a shows the connection of the compact disk read only memory drive 3 to the interface connector 2, and of the floppy disk drive 4 to the parallel port 70 through a cable 6 installed at the back 5 of the computer as shown in FIG. 3b.

The parallel port 70 is used as a connector between the portable computer system and its peripheral device to send data. It is mainly used connected to a printer and a network card, or sometimes to a compact disk read only memory drive and a floppy disk drive. This parallel port 70 is directly connected to the I/O interface 60. If the peripheral device is connected to the parallel port 70, the I/O interface 60 recognizes what kind of the peripheral device is connected according to the signal derived from the pin of the parallel port 70. The floppy disk drive 4 doesn't have any internal power supply. Therefore if the floppy disk drive 4 is connected to the parallel port 70, the portable computer system has to supply power. But the user needs an extra power supply when using the floppy disk drive 4 connected to the parallel port 70 since there is no power supply in parallel port 70. An extra cable for the power supply is needed when using the floppy disk drive 4 with the parallel port 70. FIG. 3b shows how to use a Y-shaped cable. The cable 6 is connecting floppy disk drive 4 with the parallel port 70. It is the Y-shaped cable made up of several lines including a power supply line. This cable has a connector (not shown in the figure), and this connector will be connected to the jack 9 in order to supply power. Here the jack 9 is also supplying power to the keyboard 90. As in this case, if the other peripheral device like a compact disk read only memory drive 3 and a hard disk is connected to the parallel port 70, the Y-shaped cable is also needed to supply power.

According to this former technology, the Y-shaped cable is used to supply power to the peripheral device which has to be supplied power through the portable computer system and to the cable connected to the parallel port 70. However the manufacture of this Y-shaped cable is very difficult, and an extra power supply connector is required. Furthermore, when connecting or separating the peripheral device, the keyboard 90 must be connected or separated together with the jack. And this would cause damage to the peripheral device and the keyboard when this operation is done with the power "on" on the portable computer system. Therefore it costs a lot of time and inconvenience to the user as he has to shut off the power when he wants to connect or separate the peripheral device requiring the power supply from the portable computer system. Besides, some operational functions are limited in the portable computer system in order to make it portable to carry.

Figure 4:
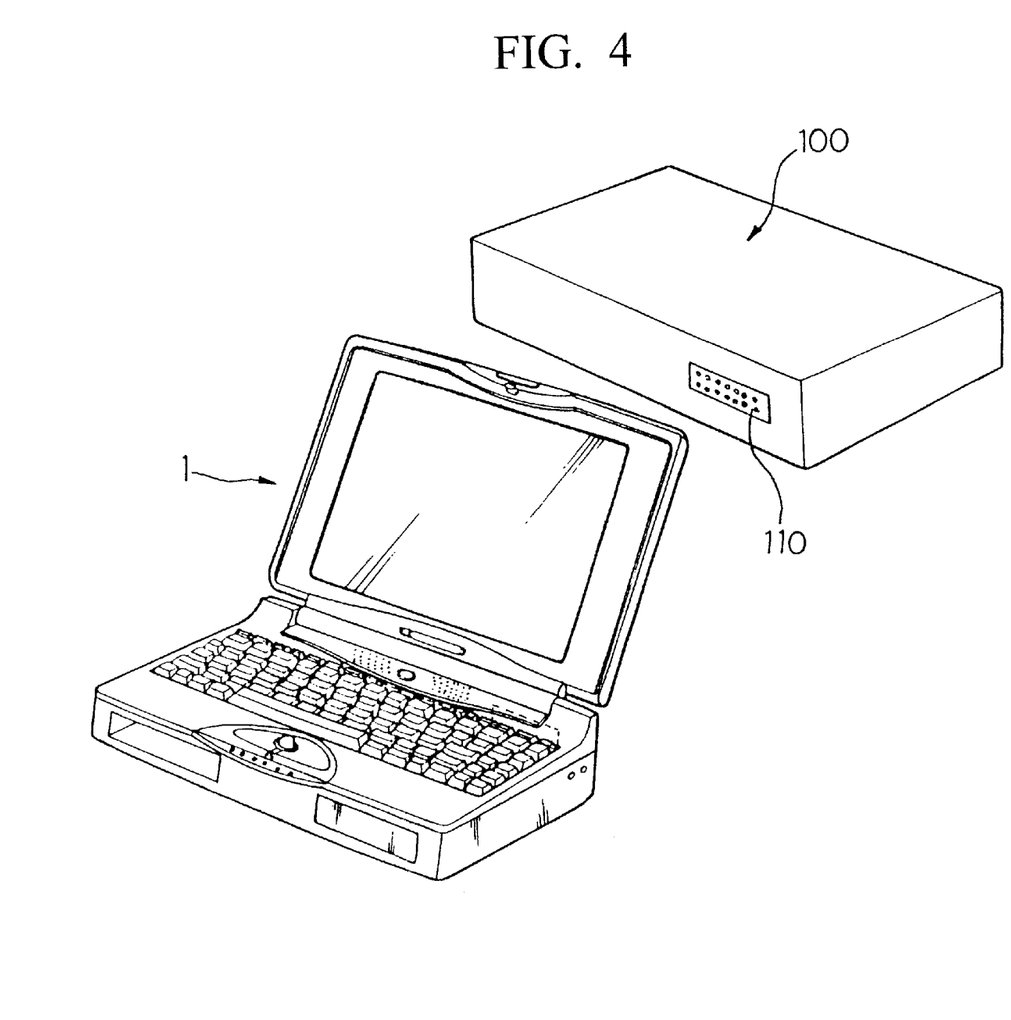
FIG. 4 is a drawing showing that the portable computer system is connected to the expansion device.

Thus the expansion device such as a port replicator or a docking station is needed and used to expand the utility of the portable computer system and to use it comfortably. FIG. 4 shows how is to connect the notebook computer with the expansion device. Reference numeral 100 is the expansion device which is connected to the computer to expand the utility and to use it more comfortably. In case of connecting the docking port 110 to the expansion device 100 and the expansion device to the computer, the connector in the computer (not shown in the figure) will be tied to the docking port 110. If the computer will be connected with the expansion device 100, the parallel port 70 installed in the computer will not be exposed to the outside. Hence, it is impossible to connect the parallel port 70 to the peripheral device. If the user wants to connect the peripheral device on the condition that the computer is linked with expansion device 100, he needs to connect parallel port in expansion device 100 (not shown in the figure) with the peripheral device.

But there is no pin supplying power in the parallel port of the expansion device 100. Therefore, in using the peripheral device needing the power supply connected to the parallel port of the expansion device, a Y-shaped cable which has the power supply line 7 is required, and the line must again be connected to the jack of the expansion device 100.

Figure 5:
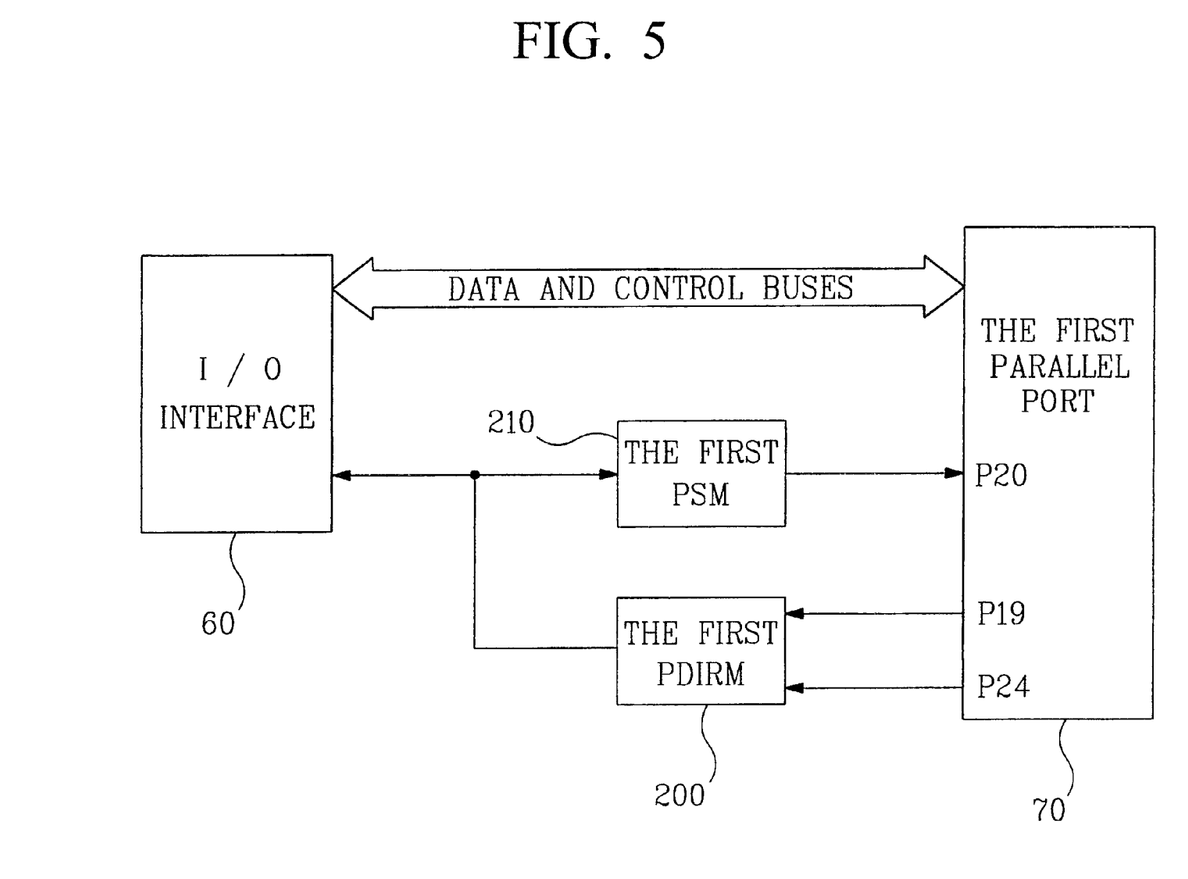
FIG. 5 is block diagram showing the structure of the computer which enables the parallel port to supply power to the peripheral device.
Figure 6:
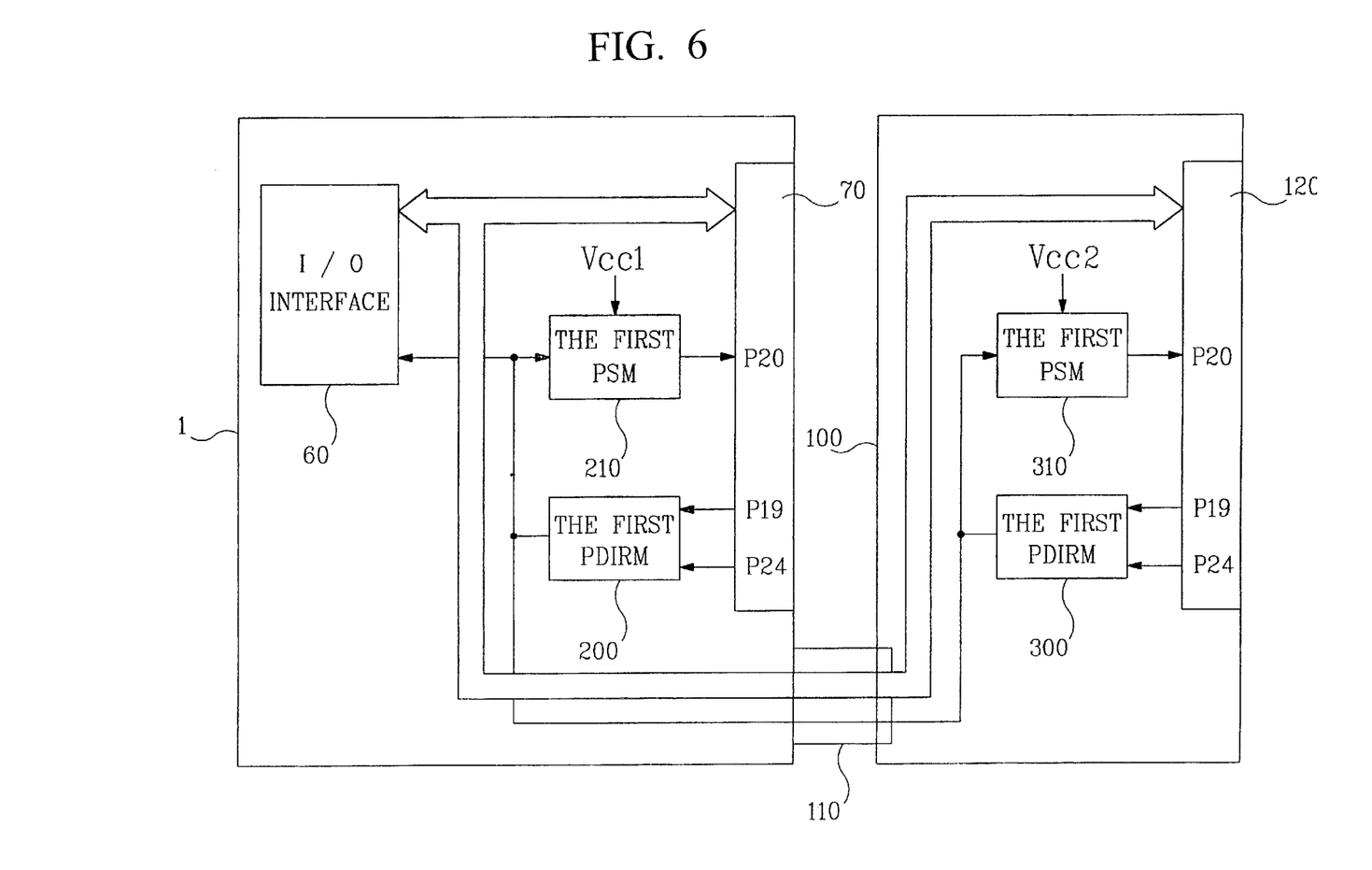
FIG. 6 is a block diagram showing the structure of the expansion device making the power supply of the peripheral device possible.
Figure 10:
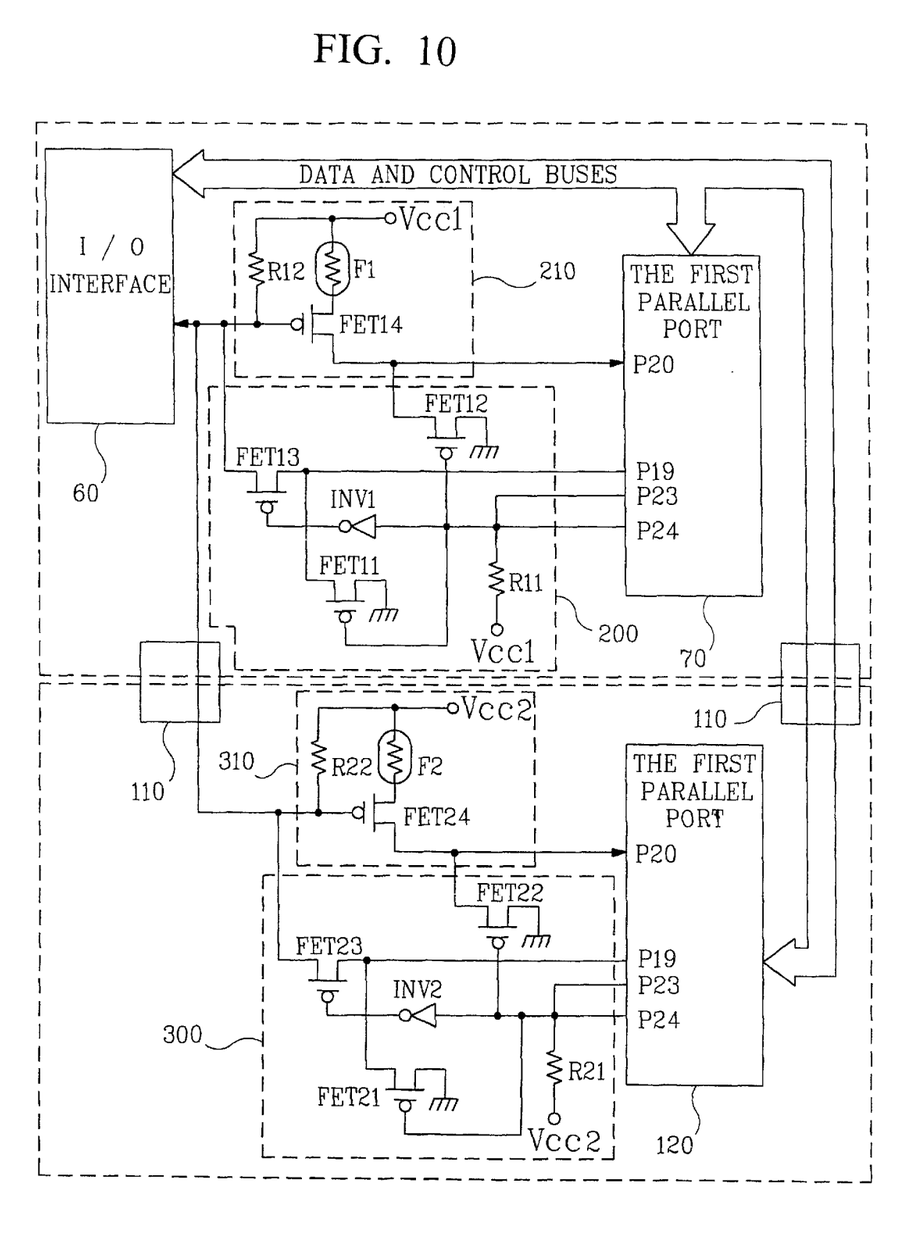
FIG. 10 is a circuit diagram showing the real example of the computer and the expansion device supplying power to the peripheral device through the parallel port.

The invention will be explained in detail with the help of the FIGS. 5 and 10. The same reference numerals will be used as before. FIG. 5 is a block diagram showing the structure of a computer supplying power to the peripheral device through the parallel port of this invention. Reference numeral 60 is an I/O interface connected to a bus of a portable computer system. Reference numeral 70 is a first parallel port installed in the main body of the portable computer system, connected to the peripheral device, and possessing 25 pins. Reference numeral 200 is the peripheral device interconnection recognizing mechanism connected to the first parallel port and recognizing the peripheral device. The peripheral device interconnection recognizing mechanism works according to the signal of the first pin, for example P19, which is tied to ground, in case the first parallel port is connected to the peripheral device in need of power supply. It also works according to the signal if the second pin, for example P24, which is tied to ground, in case the first parallel port is connected to the peripheral device in no need of power supply. Reference numeral 210 works according to the value of the third pin, for example P20, in case the first peripheral device interconnection recognizing mechanism is connected to the peripheral device in need of power supply. A third pin of the first parallel port supplies power to the peripheral device as the first power supply. FIG. 6 is a block diagram showing the structure of the expansion device which enables the power supply to the peripheral device through the parallel port of the invention. The second parallel port 120 is installed in the expansion device 100, connected to the peripheral device and possessing 25 pins. The second peripheral device interconnection recognizing mechanism 300 works exactly the same way as the first peripheral device interconnection recognizing mechanism 200. In case it is connected with the peripheral device in need of power supply, the first pin P19 of the second parallel port 120 gives the signal that the power supply is needed. If it is connected with the peripheral device with no need of power supply, the second pin P24 of the second parallel port 120 gives the signal that no power supply is needed.

Figure 7A:
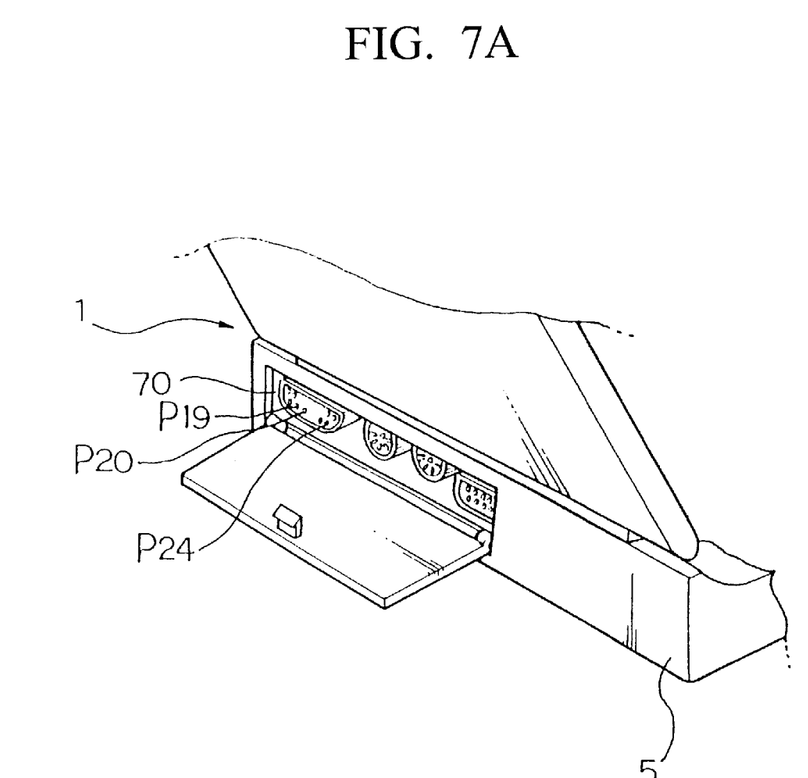
FIG. 7a is a drawing showing the parallel port installed in the portable computer system.
Figure 7B:
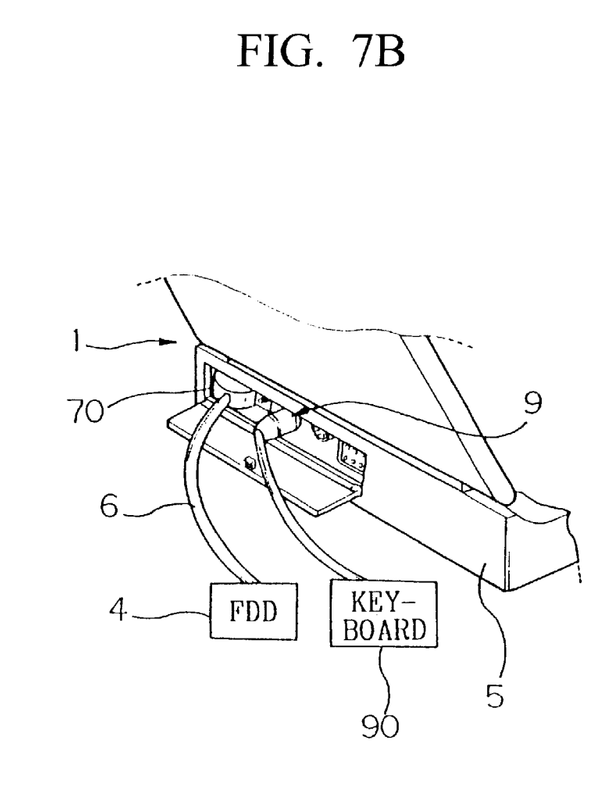
FIG. 7b is a drawing showing the floppy disk drive and the keyboard connected to the parallel port of the portable computer system.
Figure 8:
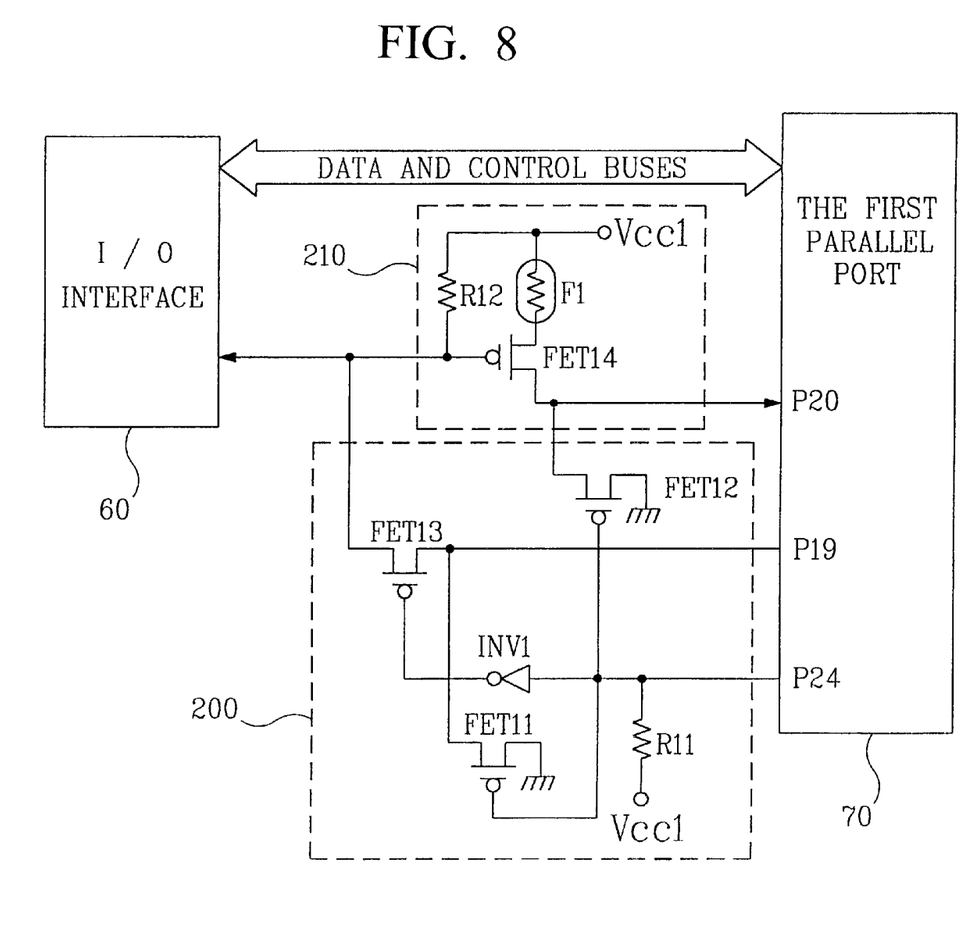
FIG. 8 is a circuit diagram showing the real example of the computer supplying power to the peripheral device through the parallel port.
Figure 9:
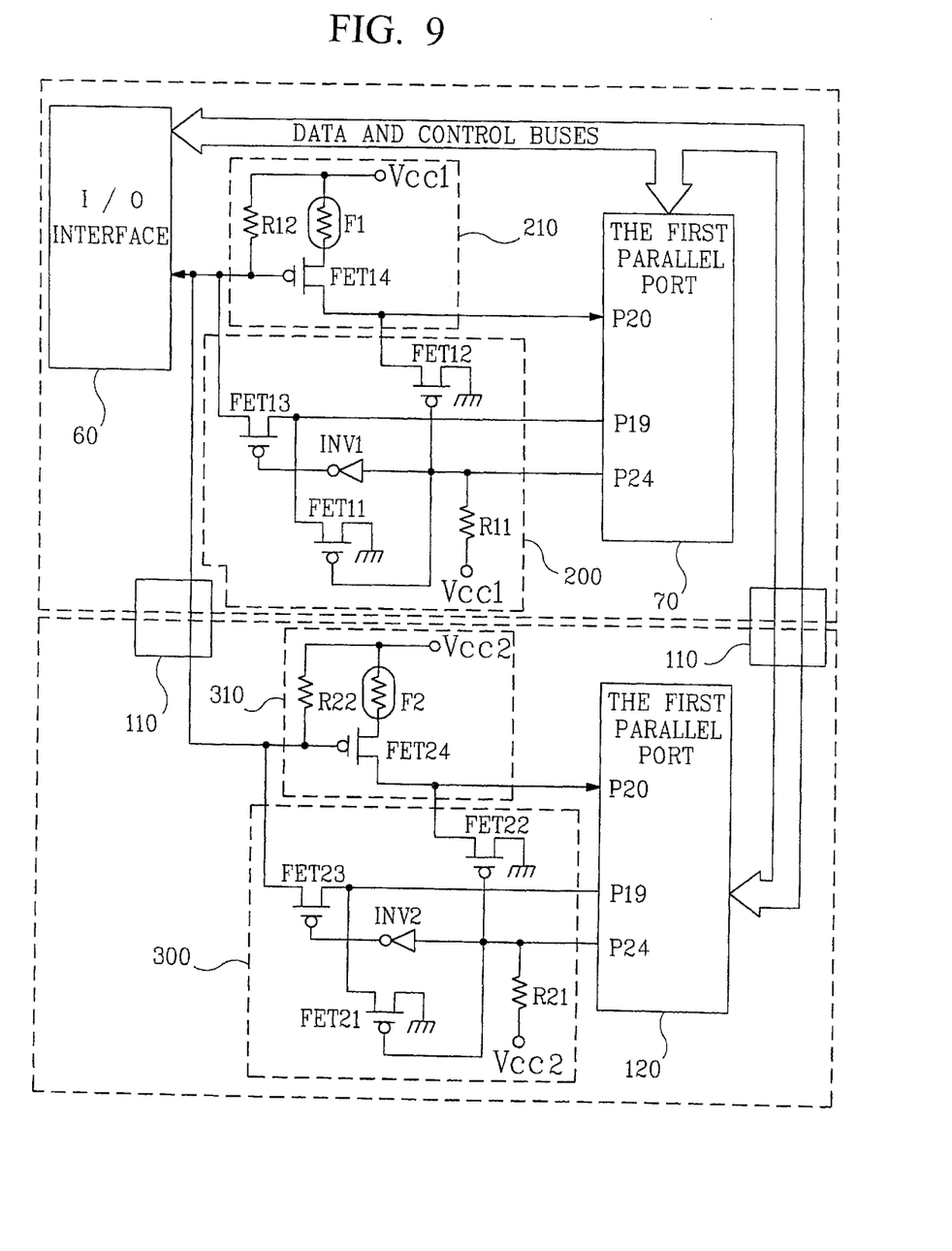
FIG. 9 is a circuit diagram showing the real example of the expansion device supplying power to the peripheral device through the parallel port.

Reference numeral 310 is the second power supply to the peripheral device in need of power. If the second peripheral device interconnection recognizing mechanism 300 recognizes that the peripheral device in need of power supply is connected to the second parallel port 120, the second power supply 310 supplies power to the peripheral device through the third pin of the second parallel port 120. The I/O interface 60, the second parallel port 120 of the expansion device 100, the second peripheral device interconnection recognizing mechanism 300 and the second power supply 310 are connected through the docking port 110. The peripheral device connected to the first 70 and the second parallel port 120 does not usually use pin 18 to pin 25. Those are just left as extra pins. From the above mentioned peripheral device, the printer is designed or all the pins from 18–25 to be connected to ground. But sometimes one of those pins is not tied to ground. A compact disk read only memory drive 3 and floppy disk drive 4 differ from a manufacturer to a manufacturer, but they usually do not use all of the pins from 18–25. Therefore in this invention, if the first parallel port 70 at the back of the portable computer system or the second parallel port 120 in the expansion device 100 will be connected to the peripheral device in need of the power supply, for example the compact disk read only memory drive 3 or the floppy disk drive 4, like in FIG. 7a, the first pin P19 of the peripheral device in need of power supply will be grounded, and through the third pin P20, power will be supplied. In FIG. 7b, it works exactly the same with the peripheral device in need of power through the cable. If the peripheral device like a printer which does not need power be connected, the second pin P24 of the peripheral device which does not need power supply will be grounded. FIG. 8 is a circuit diagram showing the example of the computer which supplies power to the peripheral device through the parallel port of this invention. FIG. 9 is a circuit diagram showing the example of the expansion device of the computer which supplies power to the peripheral device through the parallel port of this invention.

The first and the second peripheral device interconnection recognizing mechanism enable $V_{cc1}$ and $V_{cc2}$ to be connected to the second pin 24 of the first parallel port 70 and the second parallel port 120 through the resistor, R11, and R21. The common node between R11 (R21) an the second pin P24 of the first parallel port 70 and the second parallel port 120 will be connected to the gate of the grounding purpose MOS transistors (FET11, FET 12) (FET21, FET 22) and the input of inverter, (INV1) (INV2). The source of the MOS transistors (FET11, FET12) (FET 21, FET22) will be grounded, and then drain of FET 11 and FET12 will be connected to PIN 19 and P20 of the first parallel port. The drain of FET 21 and FET 22 will be connected to P19 and P20 of the first parallel port. The drain of FET 21 and FET 22 will be connected to P19 and P20 of the second parallel port 120. The output of INV1 and INV2 will be connected to the gate of the drain of the peripheral device recognizing purpose MOS transistor (FET13) (FET23). The source of FET13 and FET23 will be connected to the common node between the drain of (FET11) and (FET21) and the first pin P19 of the first parallel port 70 and the second parallel port 120. The drain of FET13 and FET23 gives then a recognizing signal. The first and the second power supply will be connected both to the gate of the power supply purpose MOS transistor (FET14) (FET24) and the input of the I/O interface 60 through the recognizing signal of the first and the second peripheral device interconnection recognizing mechanism. Vcc1 and Vcc2 will be connected to this node through R12 and R22. Vcc1 and Vcc2 will be connected to FET14 and FET24 through the fuse (F1) (F2). The source of FET14 and FET24 will be connected then to the third pin P20 of the first parallel port 70 and the second parallel port 120. Vcc1 will be provided by the computer itself, and Vcc2 by expansion device 100. This is how the invention works. Now it will be further explained how it works according to the peripheral device connected to the first and the second parallel port.

1. The first case explained is where the portable computer system is not linked to the expansion device 100, and the peripheral device is not linked to the first parallel port. If the peripheral device is not linked to the first parallel port 70, P19 and P24 of the first parallel port is in cut-off. In the first peripheral device interconnection recognizing mechanism, Vcc1 will be supplied to INV1, FET11 and FET12 through R11. Consequently, the output of INV1 will be driven to the low state, and FET 11 and FET12 will be turned off. FET13 will be turned on due to the logic low of INV1. During this operation, the first pin P19 is in an extremely high impedance state since there is no connection of the peripheral device to the first parallel port 70. Simultaneously, FET11 is turned off so that the drain of FET13 is placed in a high impedance state. Therefore in the first peripheral device interconnection recognizing mechanism, as Vcc1 is permitted to the gate of FET14 through R12, FET14 will be turned off, and Vcc1 will not be supplied to the third pin P20 of the first parallel port 70. And since Vcc1 will be the input to the I/O interface 60 through R12, the portable computer system will recognize that no peripheral device is connected to the first parallel port.

2. The second case explained is where the portable system is not linked to expansion device 100 and the first parallel port is linked to the peripheral device is in need of power supply. If the first parallel port connected to the peripheral device is in need of the power supply, the first pin P19 of the first parallel port will be grounded through the peripheral device, and the second pin P24 will be in cut-off. As in case 1, Vcc1 will be permitted to the input of INV1 through R11, and the output of INV1 then falls to low, and FET11 and FET12 is turned off, and the logic low from the first pin P19 will be permitted to the drain of FET11 and the source of FET13. Therefore the output of FET13 will be turned on through the logic low from INV1, and falls to active low. Then, Vcc1 will be applied to the drain of FET13 through R12. The logic low is applied to the gate of FET14 so that FET14 will be turned on. As a result, Vcc1 will supplies power to F1, FET14 and third pin P20 of the first parallel port. In this operation is there any over-current, FET14 will be damaged. In order to prevent this, FET14 must have a fuse F1 to cut off the current in case there will be an over-current to FET14. Then FET14 will not be damaged. And since the low state supplied to the drain of FET13 will be the input of an I/O interface, the portable computer recognizes that the peripheral device in need of power supply is connected to the first parallel port.

3. The third case explained is where the portable computer system is not linked to the expansion device 100 and the first parallel port is linked to the peripheral device without need of the power supply. When the first parallel port is connected to the peripheral device without need of power supply, the first pin P19 is disconnected, and the second pin P24 is grounded through the peripheral device linked to the first parallel port. Then the low state of P24 will be permitted to the gate of FET11 and FET12. It then will be switched to the logic high through INV1. FET11 and FET12 will be turned on, and FET13 is turned off Then, Vcc1 will be permitted to the gate of FET14 through R12. FET14 then will be turned off, and the power will not be transferred to the third pin P20 of the first parallel port. Since Vcc1 will be the input to the I/O interface through R12, the portable computer recognizes that the first parallel port is linked to the peripheral device and works according to this condition.

4. The fourth case explained is where the portable computer system is linked to the expansion device and the second parallel port is not linked to the peripheral devices. If the second parallel port 120 is not linked to the peripheral device, P19 and P24 of the second parallel port are all disconnected. In the second peripheral device interconnection recognizing mechanism, Vcc2 will be permitted to the input port of INV2 and the gate of FET21 and FET22 through R21, the output of INV2 then is in active low, and FET21 and FET22 will be turned off. FET23 will be turned on through the low level created by INV2. During this operation, as the second parallel port is not connected to the peripheral device, P19 is in an extremely high impedance.

And as FET21 is turned off, FET23 will be in cut-off. Therefore in the second power supply, Vcc2 will be permitted to the gate of FET24 through R22. Then FET24 will be turned off, and P20 of the second parallel port will not be supplied with Vcc2. Since Vcc2 will be the input to the I/O interface through R22, the portable computer recognizes that the first parallel port is not linked to the peripheral device.

5. The fifth case explained is where the portable computer system is linked to the expansion device and the second parallel port will be grounded through the peripheral device in need of power supply. In case the Do second parallel port is linked to the peripheral device in need of the power supply, the first pin P19 II of the second parallel port will be grounded through the peripheral device in need of the power supply, and the second pin P24 is in cut-off. Then, in the second peripheral device interconnection recognizing mechanism 300, as in the case where no peripheral device is linked, Vcc2 will be permitted to the input of INV2 and the gate of FET21 and FET22 through R21. Then the output of INV2 is driven to active low, and FET21 and FET22 will be turned off. The low level from the first pin P19 will be permitted to the drain of FET21 and the source of FET23. As a result, FET23 will be turned on since INV2 generates low, and the drain of FET23 is in active low. Then Vcc2 is allowed to the drain of FET23 through R22. This again permits low to the gate of FET24, and FET24 is then turned on. Vcc2 will be supplied to the peripheral device through F2, FET24, and the third pin P20 of the second parallel port.

As in the fourth case if there will be over-current in the peripheral device through the second parallel port, it is considered that the cause of this over-current is because of the over-current in FET24. Therefore F2 is needed in the drain of FET24 to cut off the current in case of the over-current in FET24, and then FET24 will not be damaged. And as the low state derived from the drain of FET23 will be the input to the input of the I/O interface, the portable computer recognizes that the peripheral device in need of the power supply is connected to the second parallel port.

6. The sixth case explained is where the portable computer system is linked to expansion device and the second parallel port to the peripheral device without need of power supply. If the second parallel port is linked to the peripheral device, like printers, which do not need power supply, the first pin P19 is disconnected, and the second pin P24 is grounded through the peripheral device linked to the second parallel port.

In this case the low level of P24 of the second parallel port is permitted to the gate of FET21 and FET22. It then turns to active high through INV2 and is allowed to the gate of FET23. FET21 and FET22 then will be turned on, and FET23 will be turned off Then Vcc2 is permitted to the gate of FET24 through R22. FET24 will be turned off, and the third pin P20 of the second parallel port will not be supplied with power. And also since Vcc2 will be the input to the I/O interface through R22, the portable computer recognizes that second parallel port is linked to the peripheral device, and operates under that condition. In this invention the first and the second peripheral device interconnection recognizing mechanism are combined with the first and the second power supply through wired OR. In case the portable computer system is not linked to the expansion device, the first parallel port only can be connected to the expansion device. If the portable computer system is linked to the expansion device, the first parallel ports is installed in the expansion device so that it is not possible to connect the peripheral device, and only second parallel port can be connected to the peripheral device. Therefore the first and the second peripheral device interconnection recognizing mechanism will work safely without any collision with the first and the second power supply. On the other hand, is a peripheral device like a printer with no need of power supply and therefore grounded P19 connected to the first and second parallel port, (FET13, FET14) and (FET23, FET24) will be turned on in a moment when P19 is grounded earlier than P24. Then Vcc1 will be allowed through F1, F2, FET14, FET24, the first and the second parallel port. This would cause an over-current, and F1 and F2 will be cut off by a mistake. In order to prevent this, P19 of the first and second parallel port should be shorter than P24 in length so that P19 will be connected later than P24. This will then stop the over-current in F1 and F2.

And as already has been mentioned, the printer doesn't have all of the pins from 18 to 25 though it should ground all the pins from 18 to 25 which interconnect P23 as therefore reasonable to interconnect P23 and P24 in parallel to find out the peripheral device with no need of the power supply. FIG. 10 shows an example of this where, except P19 and P20 from all the pins 18 to 25 in first and the second parallel port, two pins 23 and P24 are used. As it has been explained above, this invention deals with the case where the portable computer system and the parallel port on the expansion device is connected to the peripheral device. It recognizes the peripheral device, and in case the peripheral device needs the power supply, power will be supplied through the parallel port. If the peripheral device does not need power supply, power will be then turned off. This system makes it easy to connect the peripheral device to the portable computer system and the parallel port on the expansion device, and even if the power of the portable computer system and the expansion device is on, the peripheral device can be connected and separated easily to the parallel port.

What is claimed is:

1. A computer system, comprising:
    a portable computer;
    a parallel port disposed on said portable computer, said parallel port for connection to a peripheral device and capable of delivering power to said peripheral device, wherein said parallel port comprises a first pin, a second pin, and a third pin, said first pin for detecting and signaling if said peripheral device is in need of power from said portable computer, said third pin for supplying power to said peripheral device depending on a signal from said first pin, and said second pin for signaling if no power is to be supplied to said peripheral device; and
    a peripheral device interconnection recognizing means connected to said first pin and to said second pin of said parallel port for determining whether or not said peripheral device is in need of power via said parallel port.

2. The computer system of claim 1, further comprising a power supply connected to said third pin of said parallel port for supplying power via said parallel port to said peripheral device.

3. The computer system of claim 2, wherein said power supply comprises:
    a DC voltage supply;
    a first resistance and a second resistance, each having a first end and a second end; and
    a semiconductor switch having a control terminal and having a first terminal and a second terminal of a principal conducting path, said second terminal of said principal conducting path of said semiconductor switch being connected to said third pin of said parallel port, said first end of said first resistance being connected to said first terminal of said principal conducting path of said semiconductor switch, said second end of said first resistance being connected to said DC voltage supply, said second end of said second resistance being connected to said DC voltage supply, said first end of said second resistance being connected to said control terminal of said semiconductor switch.

4. The computer system of claim 3, wherein said peripheral device interconnection recognizing means comprises:
    a first semiconductor switch, a second semiconductor switch, and a third semiconductor switch, each having a control terminal and a first terminal and a second terminal connected to the principal conducting path;
    an inverter connected between said second pin of said parallel port and said control terminal of said third semiconductor switch; and
    a resistance connected between said second pin of said parallel port and said DC voltage supply, said first semiconductor switch having said control terminal connected to said second pin of said parallel port, having said first terminal connected to said principal conducting path connected to ground, and having said second terminal connected to said principal conducting path connected to said first pin of said parallel port, said second semiconductor switch having a first terminal connected to said principal conducting path connected to ground, having said second terminal connected to said principal conducting path connected to said third pin of said parallel port, and having said control terminal connected to said second pin of said parallel port, said third semiconductor switch having said first terminal connected to said principal conducting path connected to said first pin of said parallel port, and having said second terminal connected to said principal conducting path connected to said control terminal of said semiconductor switch of said power supply.

5. The computer system of claim 4, further comprising an expansion device for connection to said parallel port, said expansion device including a second parallel port, a second power supply and a second peripheral device interconnection recognizing means enabling said peripheral device to be connected to and receive power from said second power supply.

6. The computer system of claim 5, wherein said second parallel port comprises a first pin, a second pin, and a third pin, said first pin for detecting and signaling if said peripheral device is in need of power, said third pin for supplying power to said peripheral device depending on a signal from said first pin, and said second pin for signaling if no power is to be supplied to said peripheral device;
    wherein said second peripheral device interconnection recognizing means is connected to said first pin and to said second pin of said second parallel port for determining whether or not said peripheral device is in need of power via said second parallel port, and wherein said second power supply is connected to said third pin of said second parallel port for supplying power via said second parallel port to said peripheral device.

7. The computer system of claim 6, wherein said second power supply comprises:
    a second DC voltage supply;
    a first resistance and a second resistance, each having a first end and a second end; and a semiconductor switch having a control terminal and having a first terminal and a second terminal of a second principal conducting path, said second terminal of said second principal conducting path of said semiconductor switch of said second power supply being connected to said third pin of said second parallel port, said first end of said first resistance of said second power supply being connected to said first terminal of said second principal conducting path of said semiconductor switch of said second power supply, said second end of said first resistance of said second power supply being connected to said second DC voltage supply, said second end of said second resistance of said second power supply being connected to said second DC voltage supply, said first end of said second resistance of said second power supply being connected to said control terminal of said semiconductor switch of said second power supply.

8. The computer system of claim 7, wherein said second peripheral device interconnection recognizing means comprises:
   a first semiconductor switch, a second semiconductor switch, and a third semiconductor switch, each having a control terminal and a first terminal and a second terminal connected to the second principal conducting path;
   an inverter connected between said second pin of said second parallel port and said control terminal of said third semiconductor switch of said second peripheral device interconnection recognizing means; and
   a resistance connected between said second pin of said second parallel port and said second DC voltage supply, said first semiconductor switch of said second peripheral device interconnection recognizing means having said control terminal connected to said second pin of said second parallel port, having said first terminal connected to said second principal conducting path connected to ground, and having said second terminal connected to said second principal conducting path connected to said first pin of said second parallel port, said second semiconductor switch of said second peripheral device interconnection recognizing means having said first terminal connected to said second principal conducting path connected to ground, having said second terminal connected to said second principal conducting path connected to said third pin of said second parallel port, and having said control terminal connected to said second pin of said second parallel port, said third semiconductor switch of said second peripheral device interconnection recognizing means having said first terminal connected to said second principal conducting path connected to said first pin of said second parallel port, and having said second terminal connected to said second principal conducting path connected to said control terminal of said semiconductor switch of said second power supply.

9. An expansion device for a portable computer, comprising:
   a docking port for connecting to another docking port of said portable computer;
   a parallel port for connecting to a peripheral device and capable of delivering power to said peripheral device, wherein said parallel port comprises a first pin, a second pin, and a third pin, said first pin for detecting and signaling if said peripheral device is in need of power, said third pin for supplying power to said peripheral device depending on a signal from said first pin, and said second pin for signaling if no power is to be supplied to said peripheral device;
   a peripheral device interconnection recognizing means being connected to said first pin and to said second pin of said parallel port for determining whether or not said peripheral device is in need of power via said parallel port; and
   a circuitry for connecting said parallel port with said docking port.

10. The expansion device of claim 9, further comprising a power supply connected to said third pin of said parallel port for supplying power via said parallel port to said peripheral device.

11. The expansion device of claim 10, wherein said power supply comprises:
   a DC voltage supply;
   a first resistance and a second resistance, each having a first end and a second end; and
   a semiconductor switch having a control terminal and having a first terminal and a second terminal of a principal conducting path, said second terminal of said principal conducting path of said semiconductor switch being connected to said third pin of said parallel port, said first end of said first resistance being connected to said first terminal of said principal conducting path of said semiconductor switch, said second end of said first resistance being connected to said DC voltage supply, said second end of said second resistance being connected to said DC voltage supply, said first end of said second resistance being connected to said control terminal of said semiconductor switch.

12. The expansion device of claim 11, wherein said peripheral device interconnection recognizing means comprises:
   a first semiconductor switch, a second semiconductor switch, and a third semiconductor switch, each having a control terminal and a first terminal and a second terminal connected to the principal conducting path;
   an inverter connected between said second pin of said parallel port and said control terminal of said third semiconductor switch; and
   a resistance connected between said second pin of said parallel port and said DC voltage supply, said first semiconductor switch having said control terminal connected to said second pin of said parallel port, having said first terminal connected to said principal conducting path connected to ground, and having said second terminal connected to said principal conducting path connected to said first pin of said parallel port, said second semiconductor switch having a first terminal connected to said principal conducting path connected to ground, having said second terminal connected to said principal conducting path connected to said third pin of said parallel port, and having said control terminal connected to said second pin of said parallel port, said third semiconductor switch having said first terminal connected to said principal conducting path connected to said first pin of said parallel port, and having said second terminal connected to said principal conducting path connected to said control terminal of said semiconductor switch of said power supply.

* * * * *